C. RING.
COMBINATION TAIL AND AUTOMOBILE LICENSE LIGHT.
APPLICATION FILED FEB. 28, 1921.

1,390,927.

Patented Sept. 13, 1921.

INVENTOR.
Catherine Ring.

UNITED STATES PATENT OFFICE.

CATHERINE RING, OF DETROIT, MICHIGAN.

COMBINATION TAIL AND AUTOMOBILE-LICENSE LIGHT.

1,390,927.  Specification of Letters Patent.  Patented Sept. 13, 1921.

Application filed February 28, 1921. Serial No. 448,572.

*To all whom it may concern:*

Be it known that I, CATHERINE RING, a citizen of the United States, residing at Detroit, in the county of Wayne and State of Michigan, have invented a new and useful Improvement in Combination Tail and Automobile-License Lights, of which the following is a specification, reference being had to the accompanying drawings in explaining its nature.

The invention has for its object the provision of means whereby tail lights may be mounted upon the license plate of automobiles directly and secured to them at different lengthwise positions; and consists of the improvements particularly pointed out in the appended claims.

Figure 1:
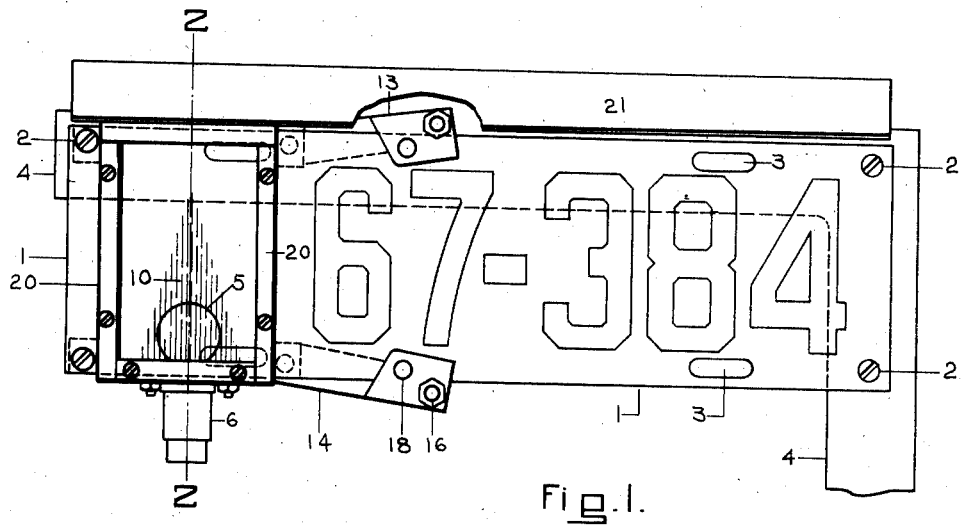
Figure 2:
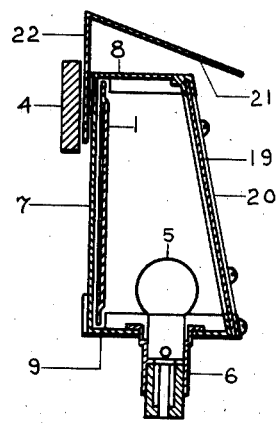
Figure 3:
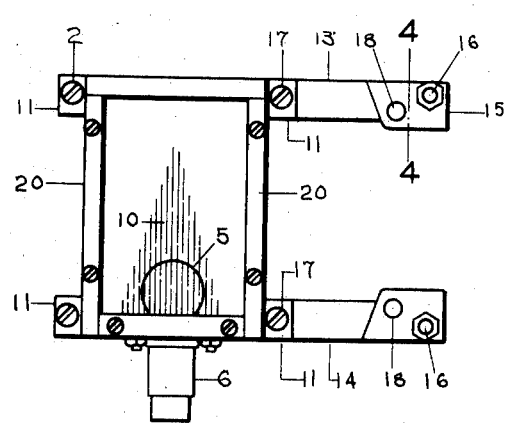
Figure 4:
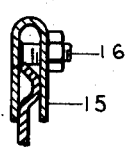

Referring to the drawings, Figure 1, is an elevation showing my invention as applied to the rear license plate of an automobile. Fig. 2, is a vertical section on the line 2—2 of Fig. 1. Fig. 3, is an elevation of my device separately and Fig. 4, is an enlarged section on line 4—4 of Fig. 3, but showing a portion of license plate in position.

In the drawings, 1, represents a typical license plate as furnished by this State; it is provided with holes in the four corners where I have shown attaching screws 2, also with four slotted openings 3, 3, evidently intended to facilitate attachment but not usually used at the rear of the vehicle. At the central portions the rim of the plate is crimped as indicated in Fig. 4, and the left hand end has the letters MICH and the date stamped thereon which latter I have not attempted to show. The license plate at the rear of the vehicle is usually fastened upon some form of bracket 4, by screws 2, or by bolts and the bracket is secured to the rear of the vehicle.

I use a small bulb incandescent lamp 5, and socket 6, as usual, furnished with current from the usual electrical equipment of the vehicle. The lamp is fastened in the bottom of a box like container and is on a level with the bottom portion of the number plate. The container is made of sheet metal, its back 7, top 8, and bottom 9, being made integral as also may be the ribs not lettered underlying the ledges 20, later referred to. The sides of the container are open and through the openings and close to the back is passed the license plate 1, the opening measured from top to bottom being large enough to permit same.

Four ears 11, are formed by continuing the metal of the back beyond the rectangular outline of the container, these ears are pierced for the reception of screws as 2, spaced vertically to correspond to the distance apart of the corner holes of the license plate. These ears are alike in size and upon the back side of one pair of ears I pivot long clamping links 13, 14, the outer ends of which are extended laterally to fold over the edges of the license plate as at 15, and form with the through bolt 16, clamps, attaching to the edge of the plate. In the drawing the device is shown upon the left hand end of the plate and the links are pivoted to the ears by screws 17. Should it be desired to place the device upon the right hand end of the license plate the links may be used upon the ears of the opposite side. To use the device opposite the central part of the plate I provide the links with two other holes 18 situated from the center line of the device as far as the plate measures from its center to the holes 3, 3, before mentioned and attach by bolts through the holes aforesaid. Different widths of license plates are accommodated by the ability of the swinging arms to move apart more or less and still reach their edges. License plates vary in the grouping of the figures and letters thereon and the present device is intended to be used at such lengthwise position thereon as will give maximum legibility. Also it will be noted that the lugs 11, while primarily intended for the attachment of the swinging links still are so located that the pair not so used will be of possible use for direct attachment when the chosen location of the device so permits.

The front of the device comprises a window 19 of transparent material secured under ledges 20, screwed to the side ribs and bottom walls of the container and the portion of the window immediately in front of the lamp is colored red in a triangular device 10. As drawn the device would show as a triangular red light when the lamp was burning and as viewed from the rear of the vehicle. At the same time the body of the license plate would be illuminated by light coming through the side opening. Also I place a reflector 21, slightly inclined, above the license plate and secure the reflector by a cape 22 extending downward and by same bolts 2 used in securing plate. Portions of the light reaching this reflector are thrown upon the license plate.

What I claim and desire to secure by Letters-Patent are:

1. In combination with a license plate, a lamp carrier provided with attaching ears, said ears being perforated, screws passing from two of said ears through existing holes of the license plate, and links pivoted at one end to the other two ears and provided at their outer ends with clamps embracing the said plate.

2. In combination with a license plate, a lamp carrier provided with perforated attaching ears, said ears being located on the lamp carrier near the top and bottom of the license plate, and links pivoted at one end to said ears and provided at their outer ends with clamps embracing the edge of said plate.

3. The combination with a license plate, of a lamp casing, means for securing said lamp casing on the license plate at adjusted positions, including pivoted links carried by the casing and arranged to clamp over the edges of the license plate, one side of said casing being formed of transparent material and having a portion thereof colored, and an incandescent bulb carried by said casing in position to throw its luminous rays upon said colored portion and the indicia of the license plate.

CATHERINE RING.